FIG. 1

Oliver B. Keister, Jr.
Charles M. Hursh
John G. Link,
INVENTORS.

FIG. 2

Oliver B. Keister, Jr.
Charles M. Hursh
John G. Link,
INVENTORS.

FIG. 3

Oliver B. Keister, Jr.
Charles M. Hursh
John G. Link,
INVENTORS.

Oliver B. Keister, Jr.
Charles M. Hursh
John G. Link,
INVENTORS.

FIG. 10

Oliver B. Keister, Jr.
Charles M. Hursh
John G. Link,
INVENTORS.

United States Patent Office 3,446,373
Patented May 27, 1969

3,446,373
REMOTELY CONTROLLED AUTOMATIC HOPPER CAR DOOR ACTUATING MECHANISM
Oliver B. Keister, Jr., 1907 Monticello Road, Florence, Ala. 35630, Charles M. Hursh, Wilmington, Del. (1425 Bobolink Lane, West Chester, Pa. 19380), and John G. Link, 310 Colonial Drive, Florence, Ala. 35630
Filed Apr. 7, 1966, Ser. No. 540,974
Int. Cl. B61d 7/02; B65g 67/24
U.S. Cl. 214—63                                6 Claims

ABSTRACT OF THE DISCLOSURE

An automatic hopper car dumping control mechanism having on a hopper car an electric power source, a pneumatic air supply source, and an electro-pneumatic valve to actuate a pneumatic dumping system. The electro-pneumatic valve is activated by means of a pretuned audio frequency receiver carried on said car loop-coupled to and adapted to receive an audio frequency signal from a selectively located wayside audio frequency transmitter to energize the electrical power circuit to the valve. A safety switch to prevent premature dumping is located on the hopper car interposed in the circuit between the power source and the valve, said switch being normally open to maintain the power circuit in a normally de-energized state. The switch, in one embodiment, is an air pressure switch responsive to a metered increase in air pressure, while, in another embodiment, it is an electronic switch having an audio frequency receiver responsive to receive an overlayed metered audio frequency signal from the wayside transmitter completing a transistorized circuit, thus to close the safety switch in each case and allow the power circuit to be energized in the dumping area.

---

This invention relates to automatic controls for the hopper door mechanism of railroad cars or similar vehicles used to transport bulk material, and it deals more specifically with an automatic hopper car dumping mechanism for such cars normally discharged through bottom hopper doors.

One of the best and the most efficient form of transportation for bulk materials such as coal, sand, rock aggregates, and various types of ores, is the railroad hopper car. While other forms of transportation are used, during the last few decades more than fifty percent of all coal has been hauled by the railroads, and various types of specialized hopper cars have been devised to do this job.

The usual hopper car comprises a large bin of considerable depth having downwardly converging sides from each end. These terminate in the bottom of the hopper car where are located one or more series of pairs of doors which open in a downward direction on hinges to dump the contents of the car. The doors are equipped for manual operation, in most instances, and are dumped by means of a lever on the side of the car which is actuated by a man operating the same in the dumping area. The doors can then be closed manually after the bin of the car is emptied and the next car pulled into the dumping area.

Various mechanical booster devices have been employed to assist in opening the doors, including electric motors and pneumatic controls. However, each of these embodies halting the train over the dumping area and the time consuming operation of having a man actuate or operate the various mechanisms to open and close the door. The cars are usually individually dumped from a raised dumping area over a conveyor belt or over a stockpile for the coal ore, or the like. The individual dumping of individual cars is a time consuming operation, especially on a long train comprising a hundred or more cars.

At the same time, various automatic means have been employed, including levers which project from the hopper car and trip the doors in the dumping area, as well as various electric contact means actuating electric motors on cars. In each of these cases it is necessary for some projection of the railroad car and the possibility of accidental contact tripping the dumping mechanism during the normal travel of the train is extremely high with this type of device.

In various other applications, magnetic signals and other types of electrical signals have been transmitted from wayside stations to traveling cars to set brakes and do various jobs, such as disconnecting cars and actuating signals. In all of these systems, however, there remains the danger of the possibility of premature actuation of the dumping mechanism, either by some overt act from the cab of the engine or a locomotive, or by some outside transmission received by the dumping mechanism activating the same while the railroad cars are moving at high speed, resulting in a derailment.

One of the problems involved in the use of electric power sources for performing the actual function of opening and closing of the hopper car doors is the necessity for a rather large electric power source during the dumping operation, including a separate electric power source of sufficient power to perform this operation. Usually the power source must be centrally located on the train, preferably in the locomotive, involving setting in motion the power source when the locomotive reaches the dumping area with obvious inconveniences, and each of the cars must at all times be connected to the central power source.

A primary power source always present on a train is air, for trains must always carry air to actuate the braking mechanism on each of the railroad cars. This is a convenient source of power and it is one which can be maintained on all of the railroad cars. The inherent nature of railroad cars is such that when cars are disconnected it is still sometimes possible to maintain air on each individual car. We have accomplished this by means of providing a reservoir on each car as a part of our system to preserve a supply of air sufficient for operation. This air is used in a pneumatic system employing a reciprocating piston which opens and closes the doors of the hopper car.

In view of the foregoing, it is therefore a primary object of our invention to provide a means on each individual railway hopper car which is self containing for the purpose of opening and closing the hopper doors in the dumping area.

A salient feature of our invention resides in the fact that we employ train air to operate the pneumatic system which opens and closes the doors of the hopper car, but such air is supplemented by a storage reservoir on each car carrying sufficient air to accomplish this operation.

It is necessary, in connection therewith, to provide a means for setting in motion or actuating the dumping mechanism in the dumping area, but insuring against the premature activation of said mechanism during the time when the train is in normal running operation between loading and dumping stations.

It is therefore a further object of our invention to provide, in connection with a railway car of the character described, safety means in combination with the pneumatic system whereby the hopper doors will not be allowed to open except when the car is in the proper dumping area.

It is therefore a further important feature of our invention that we have provided electro mechanical means for actuating the pneumatic system in the dumping area, which means are provided with power carried on each individual railroad hopper car, and means by which the electro mechanical system can be maintained in the safe non-operative condition until appropriately activated by a signal in the dumping area.

Accordingly, we have applied our invention in the embodiment shown herein to a railroad hopper car. The control system is electro-pneumatic and consists of two principal units. The first unit we refer to as the "wayside" equipment and the second unit we refer to as the "car mounted" equipment.

The wayside unit consists of a transmitter coil or combination of coils each of which is connected electrically to an audio frequency transmitter and a 12 volt D.C. power supplier. The wayside coil, or combination of coils, is located parallel to the railroad track in such a position that the contents of the car or cars will be discharged within a defined area whether the cars are moving or stationary.

The car mounted equipment, in the embodiment illustrated, consists of two receiving coils, each one of which is, in this illustration, mounted on the opposite side and opposite ends of the car away from the other coil. This makes it possible to receive a signal from the wayside transmitter regardless of the heading of the car. The car mounted coils are connected electrically to an audio frequency receiver which is pre-tuned to receive a signal of the identical frequency as that transmitted by the wayside audio frequency transmitter. The direct current output power of the audio frequency receiver is connected to the coil of an electromagnetic relay. When this relay is energized the front contact passes direct current to a coil of a four-way solenoid valve. This valve controls the flow of air to the door operating cylinders.

An essential part of the car mounted equipment is a metered signal responsive safety switch which controls the flow of the direct current power, furnished by a 12 volt battery, to the solenoid valve. Hence, until the safety switch is closed allowing current to flow to the solenoid valve, the solenoid valve cannot be activated and the system cannot be set in motion.

The pneumatic system for opening and closing the hopper doors comprises, essentially, a reciprocating piston operating in an air cylinder located on the bottom of the car opposite the hopper doors. This cylinder is so positioned that when the piston is reciprocated on an arm linkage the hopper doors are opened when the pistons move all the way in the air cylinder in one direction and close when the piston moves all the way in the air cylinder in the opposite direction.

Air is admitted to the air cylinder, or cylinders in the case of a multiple series of hopper doors located under a car, through a system of air lines connected through the four-way solenoid air valve to a dumping reservoir located on each railroad car.

Air is provided to the system, in the illustrated embodiment of the invention, either from the main train air line or from a separate train air line, or a combination of both. In order to make the units self-containing, the air is drawn from one of these sources into a dumping reservoir, and allowed to flow under pressure from the dumping reservoir into the air line supplying the air cylinder. As will be described in more detail, when air is taken from the main train line it is drawn through the AB brake valve by means of the "No. 11 Port" as it is commonly known with this type of valve.

We employ, in combination with the other elements, a safety means for preventing premature activation of the solenoid air valve before the car reaches the dumping area. This has two embodiments, an air pressure safety switch and an electronic safety switch either of which may be used. In the first embodiment shown, this safety means, which is adapted to receive a metered signal to close an electrical contact, thereby supplying electrical energy to the system, consists of an air pressure switch. The air pressure switch is connected into the main supply line which supplies air to the reservoir.

It can readily be seen that a safety switch of this type will be activated by a predetermined air pressure, or a metered amount of air applied to the pressure switch. In the normal operation of the train, assuming that the train air line is maintained at a maximum point of 90 p.s.i.g. with the brakes in full release, and the train with its line of hopper cars is traveling toward the dumping area, the air pressure switch has been preset such that it will not be activated until the pressure in the line is raised 5 p.s.i.g. Any other pressure could be used which might be appropriate for the particular switch, but this is a convenient differential in pressure. Remembering that through the air pressure switch is connected the electric power leads from the direct current power source on each car, the battery, to the solenoid air valve, it can be seen that when one desires to activate the system with electrical energy it is only necessary to raise the air pressure in the main train line, or such other air line as may be used, by the 5 p.s.i.g. differential. This can easily be done by the engineer in the locomotive cab as he approaches the dumping area, and is well within the dumping area such that a premature dump could not occur.

With the system thus supplied with electrical energy from the battery carried on each car, it can be selectively activated to operate the solenoid air valve when the appropriate signal is received by the audio frequency receiver located on each car. In order that the operation of this system may be more fully understood, other and further objects of our invention, together with the features of a novelty, will appear in the course of the following description.

In the accompanying drawings which form a part of the specifications and are to be read in conjunction therewith, and in which like reference numerals are used to indicate like parts in the various views.

Figure 1:
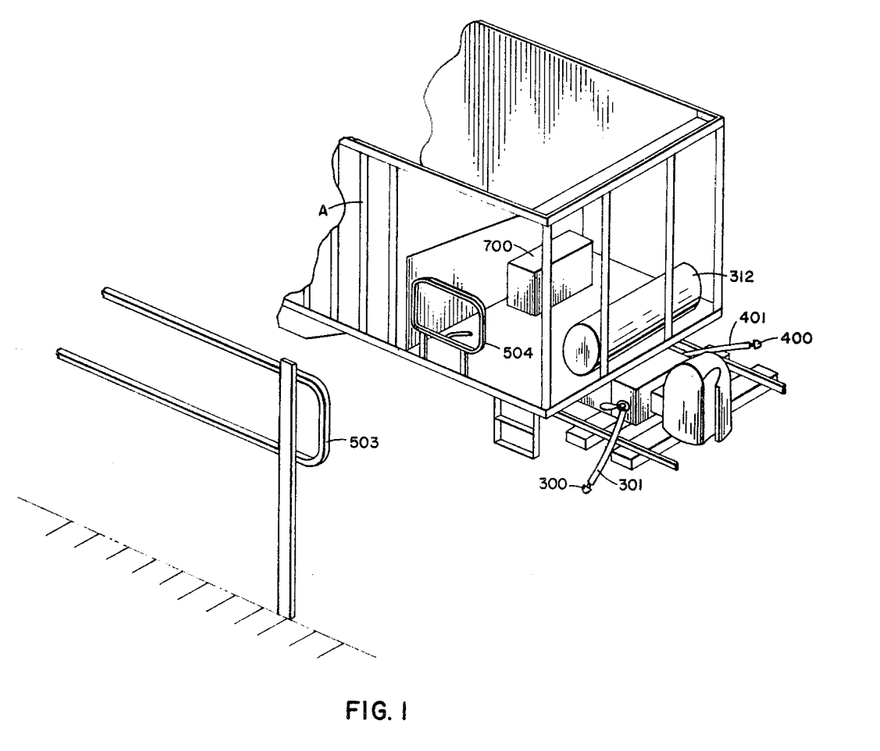
FIG. 1 is a diagrammatic view of the end of a railway hopper car, and a portion of the transmitting antenna diagrammatically shown at the wayside station.

Referring more particularly to the drawings, FIG. 1 illustrates the end of a hopper car A having a main train air line 301 provided with a glad hand connector 300. This car is also provided with a separate train air line 401 provided with a glad hand connector 400. Mounted on the end of the car, as shown for illustrative purposes, is a dumping reservoir 312, and equipment box 700, which would contain the four-way solenoid air valve and other equipment, and one of the car mounted audio frequency receiving antennas 504.

In the same FIG. 1, located at wayside in the dumping area can be seen an illustrated representation of the antenna 503 of the wayside audio frequency transmitter. This antenna, in actual practice, is elongated a sufficient length extending along the track to provide a field of transmission as hereinafter discussed with relation to the receiving antenna 504.

Figure 2:
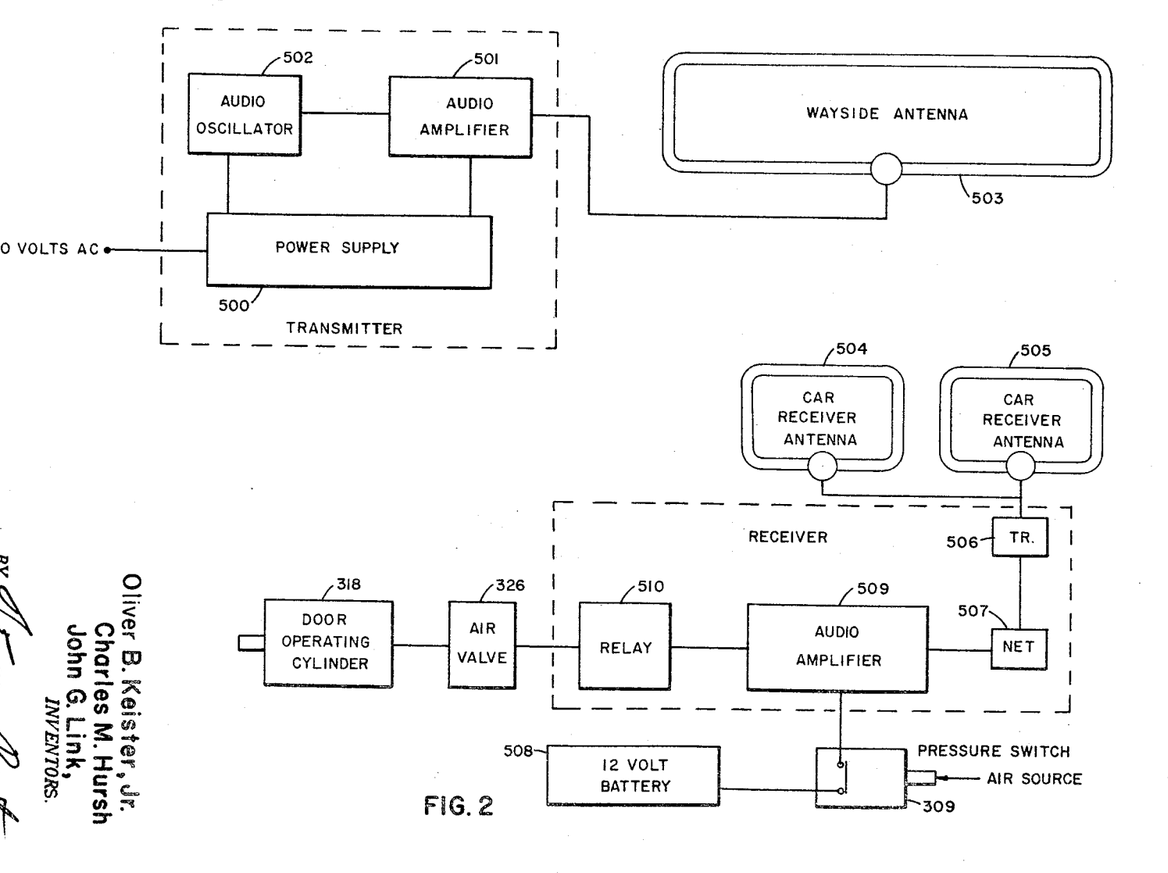
FIG. 2 is a diagrammatic illustration of the interconnection of the units of the wayside transmitting station and the car mounted receiver, together with the pneumatic system operating hopper doors.

In FIG. 2, we see a simplified block diagram of our invention. As can be seen, 110 volt AC feeds power supplier 500 which provides for a 12 volt DC output to the audio amplifier 501 and audio oscillator 502. The frequency developed in the audio oscillator 502 is fed into the input of the audio amplifier 501 which in turn is amplified to a power level needed to energize the wayside antenna 503.

Figure 4:
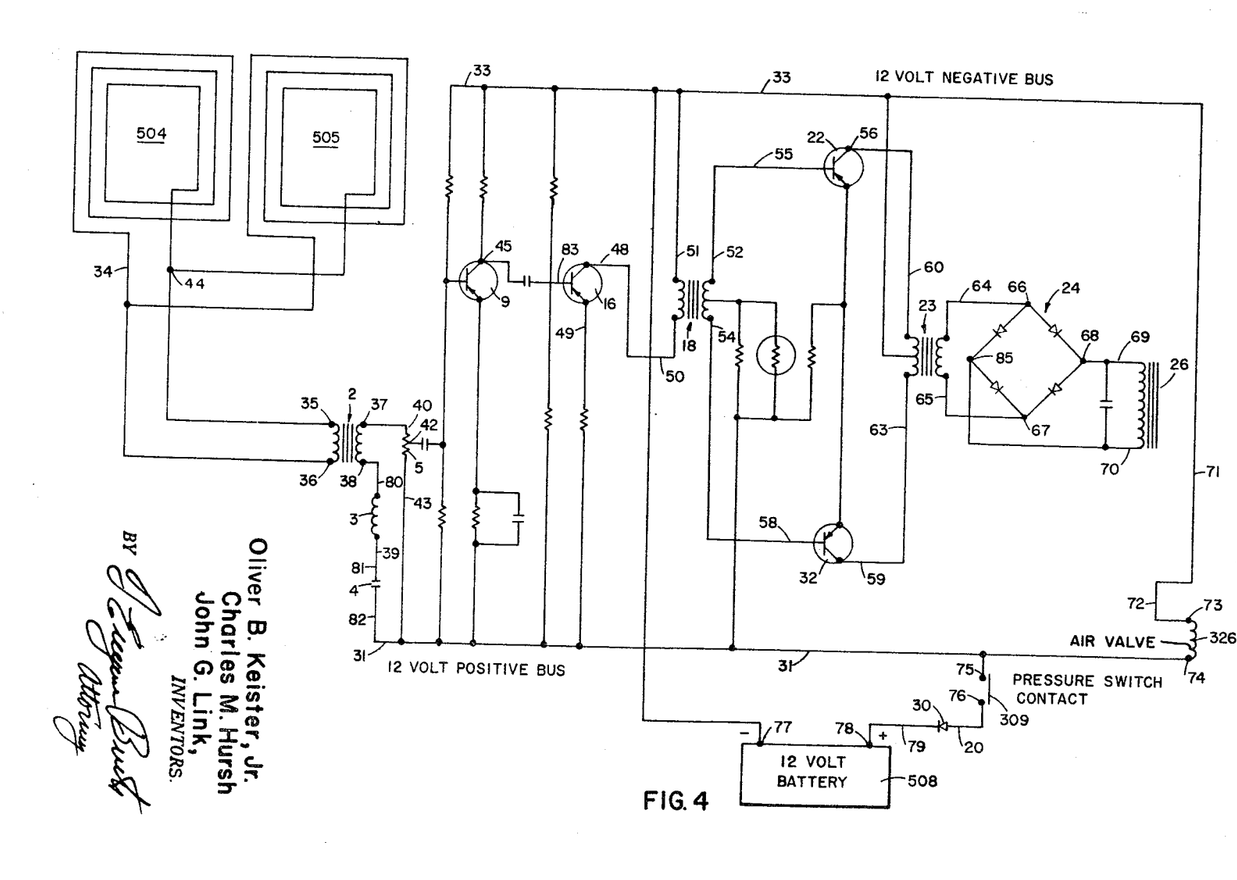
FIG. 4 is a circuit diagram of the car mounted audio frequency receiver.

When the system is in operation, the audio frequency transmitted from the wayside antenna 503 is received by the car mounted receiver antennas 504 or 505. The audio signal from these antennas is fed to a matching transformer 506. The output of the matching transformer 506 is fed to the frequency determining network 507. With the system in the energized position as determined by the closed contacts 75 and 76 (as shown in FIG. 4) of the air pressure switch 309, 12 volt DC energy is permitted to flow from the battery 508 to the audio amplifier 509.

The audio frequency signal from the output of the frequency determining network 507 is fed to the input of audio amplifier 509 and this amplified audio signal energizes the relay 510. The energized relay 510, in turn, energizes the four-way solenoid pilot air valve 326, which in turn allows air to flow to the double acting cylinders 318 to open the car doors.

When the audio signal is no longer received by the car mounted antennas 504 or 505, the four-way solenoid air valve 326 is de-energized. This reverses the flow of air to the double acting cylinder 318 and causes the doors to close.

Figure 3:
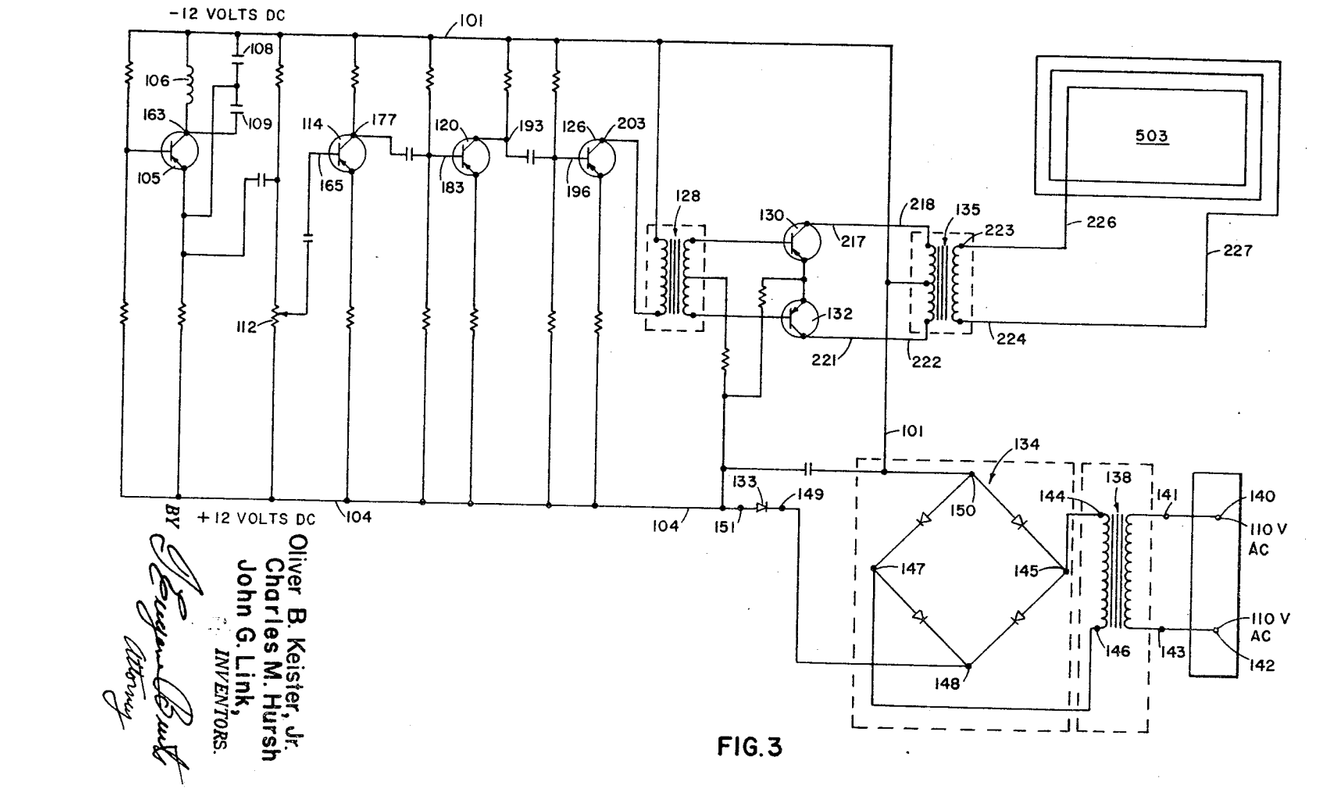
FIG. 3 is a circuit diagram of the audio frequency transmitter.

Referring more particularly to FIG. 3, the circuitry of the wayside transmitter is more easily understood. In this figure, representing the transmitter, 110 volt AC current is fed to the primary connections 141 and 143 of stepdown transformer 138 through the terminals 140 and 142. The secondary connections 144 and 146 of the stepdown transformer 138 feed full wave bridge rectifier 134 through terminals 145 and 147. The negative DC output from rectifier 134 is fed to the negative 12 volt DC bus 101. The positive DC output from rectifier 134 is fed to terminal 149 on reverse current diode 133. The negative side 151 of reverse current diode 133 is fed to the positive 12 volt DC bus 104. The reverse current diode 133 provides polarity protection for the solid state component in the transmitter.

The audio oscillator stage which consists of transistor 105, frequency determining toroid coil 106, and the terminally connected capacitors 108 and 109 to develop the desired audio frequency. The output signal from the audio oscillator stage terminals 163 and 104 is fed to the input terminals 165 and 104 to the first stage amplified transistor 114. The gain control 112 is adjustable to control the output power of the transmitter. The output of transistor 114, terminals 177 and 104, is fed to the input terminals 183 and 104 of the second amplifier stage transistor 120, which in turn raises the signal level to a higher amplitude.

The output of transistor 120, terminals 193 and 104 is fed to input terminals 196 and 104 of the driver stage transistor 126. The output from the driver stage transistor 126, terminals 203 and 104, is transformer coupled by transformer 128 to transistors 130 and 132. The output terminals 217 and 221 of transistors 130 and 132 are connected to terminals 218 and 222 of output transformer 135. The terminals 223 and 224 of output transformer 135 are connected to the wayside antenna 503, terminals 226 and 227. The low amplitude signal from the oscillator transistor 105 is amplified by transistors 114, 120, 126, 130 and 132 to raise the power level of the transmitter to a sufficient strength to energize wayside antenna 503 to provide necessary coupling signal to the car mounted antennas 504 and 505.

Referring more particularly to FIG. 4, we can see the circuit layout of the audio frequency receiver system mounted on the railroad car. The car mounted receiver is energized from a 12 volt battery 508 which would normally be located in the equipment box 700. The flow of energy from the positive terminals 78 of battery 508 is fed to terminal 79 of reverse current diode circuit. Terminal 20 of reverse current diode 30 is connected to terminal 76 of the safety switch, being the air pressure contact switch 309 in the illustrated embodiment. In the embodiment employing the pressure switch, when the pressure switch contacts 75 and 76 are closed, positive energy will flow to positive bus 31. The negative terminal 77 of battery 508 is connected to negative bus 33. The reverse current diode 30 provides polarity protection for the solid state components in the receiver in the event of incorrect battery hookup.

The audio signal received by car mounted receivers 504 or 505 at terminals 34 and 44 is fed to terminals 35 and 36 of the input matching transformer 2. The output signal from matching transformer 2 is fed from terminal 38 to terminal 80 of toroid coil 3, and from terminals 39 of toroid coil 3 to terminal 81 of capacitor 4, and from terminal 82 of capacitor 4 to input terminal 31 of transistor 9. The toroid coil 3 and capacitor 4 form the frequency selective network permitting only the desired signal to be accepted.

Terminal 37 of matching transformer 2 is connected to terminal 40 of gain control 5. Terminal 43 of gain control 5 is connected to input terminal 31. The adjustable arm 42 of gain control 5 permits the signal to be adjusted to the desired level for the proper operation of the receiver.

Transistor 9 raises the signal to a higher amplitude. Output terminal 45 of transistor 9 is fed to the input terminal 83 of transistor 16. Transistor 16 is the second stage of amplification. The output terminal 48 of transistor 16 is transformer coupled to terminals 50 and 51 of transformer 18 to output transistors 22 and 32 through terminals 52 and 54 of transformer 18 to terminals 55 and 58 of transistors 22 and 32.

The output of transistors 22 and 32, terminals 56 and 59 connect to the input transformer 23, terminals 60 and 63. Output terminals 64 and 65 of transformer 23 connect to terminals 66 and 67 of full wave rectifier 24.

Terminals 68 and 85 of full wave rectifier 24 connect to coil terminals 69 and 70 of relay 26. Negative 12 volt DC is connected to the front contact terminal 71 of relay 26. With relay 26 energized, negative 12 volt DC current will flow from heel terminal 72 to terminal 73 of four-way solenoid air valve 326, the terminal 74 of this valve being connected to 12 volt positive bus 31. This completes the circuit to energize the four-way solenoid air valve 326 which allows the air to flow to double acting cylinders 318 to open the car doors.

When the audio signal is no longer received by the car mounted antennas 504 or 505, the four-way solenoid air valve 326 is de-energized causing the car doors to close.

The pneumatic portion of the system is best illustrated by FIGS. 5, 6, 7, 8 and 9.

Figure 5:
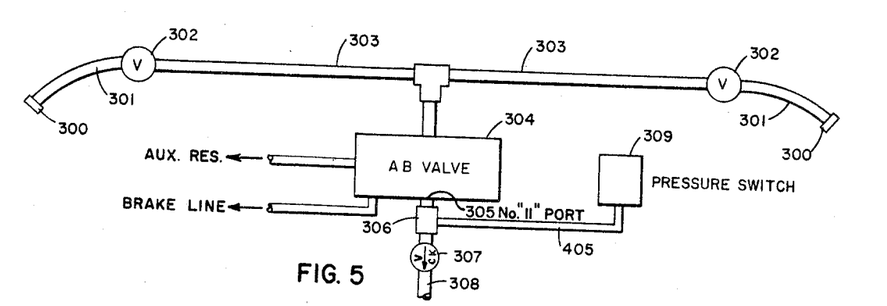
FIG. 5 is a diagrammatic illustration of the pneumatic system involving air taken from the main train air line.

In the first three of these figures we illustrate three methods of supplying air on the car to operate the hopper car doors. FIG. 5 shows air being supplied from the main train air line 303. Air is received from the locomotive through glad hand connection 300 through angle cock 302 into line 303 which flows into the AB brake valve 304. Air then flows through the "No. 11 Port" 305 through collar 306 through line 405 to the pressure switch 309. Air also flows through the collar 306 and through the check valve 307 into the intermediate line 308 as shown.

Figure 6:
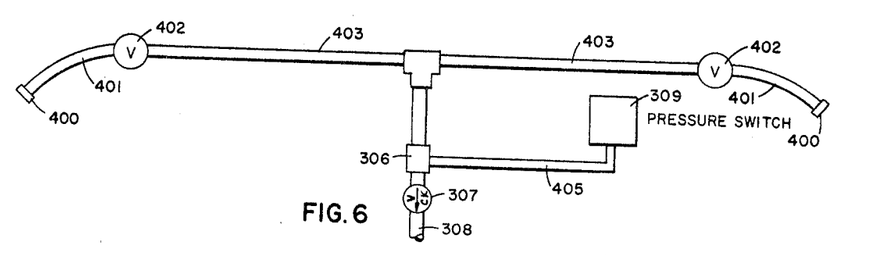
FIG. 6 is a diagrammatic illustration of the pneumatic system of air taken from a separate train line.

In FIG. 6, air is received through glad hand connection 400 into the hose connection 401, through the angle cock 402 into line 403. The air then flows downwardly through collar 306 and through line 405 to pressure switch 309 and through check valve 307 into the intermediate line 308.

Figure 9:
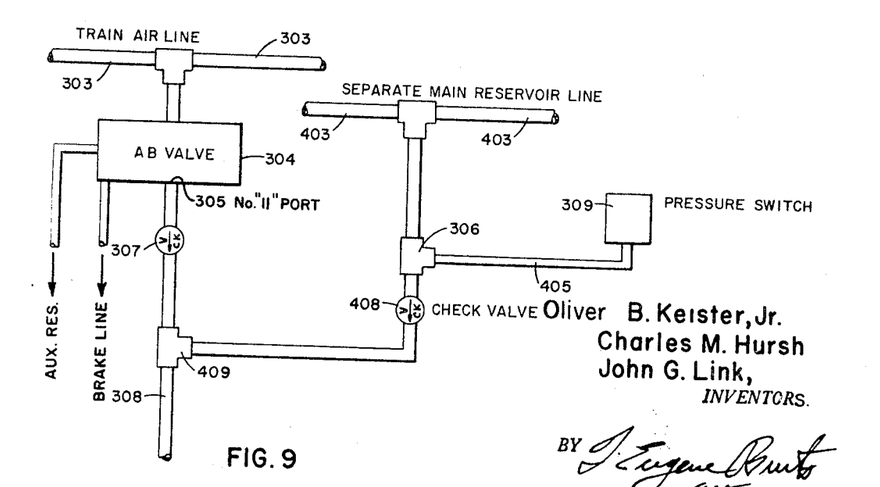
FIG. 9 is a diagrammatic view of the pneumatic system, showing a combination of the use of air from the main train air line and a separate train air line.

Referring to FIG. 9, we see that a combination of the two systems is used. In this illustration, air is fed through the main train air line 303, through the AB Brake Valve 304, through the "No. 11 Port" and the check valve 307 to the intermediate line 308. Air is also fed through a separate main reservoir line 403, through collar 306 and line 405 to pressure switch 309 and through the check valve 408 and the collar 409 into the intermediate line 308.

Figure 7:
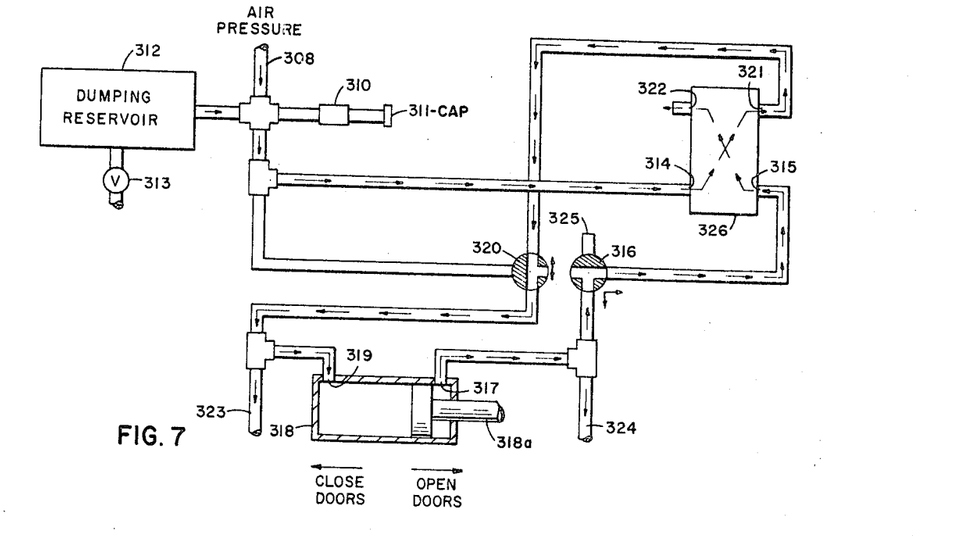
FIG. 7 is a diagrammatic view of the pneumatic system, showing the flow of air and position of the piston in opening the hopper car doors.

As previously explained, the pressure switch 309 in the embodiment shown represents a metered signal responsive safety switch maintaining said electrical system in a normally de-energized state while the train is in normal running operation before it reaches the dumping area. In this embodiment, the metered signal which is fed to the air pressure switch in order to close the contact on the same is represented by a metered increase in the air pressure through the main train air line 303 or the separate train air line 403, which is also designated as a separate main reservoir line. As seen in FIG. 7, the dumping reservoir 312 has been charged through the line passing through the AB brake valve or the separate train line to the desired reservoir pressure. Where the AB brake valve is used, check valve 307 is required to prevent air from flowing back into the brake valve 304 and also to restrict the flow of air to the "No. 11 Port" 305 to prevent faulty brake application. Check valve 408 is also provided where the main train line is used together with the separate train line as in FIG. 9.

Assuming that the train is operating on the road with a normal air pressure in the main train line of 90 p.s.i.g., and in this condition the electrical contacts 75 and 76 of air pressure switch 309 are open and there is no electrical energy flowing from the battery into the system. Using the means as illustrated in FIG. 5, the system is then activated by raising the train air line pressure above the predetermined level of 90 p.s.i.g., for example, by increasing the pressure say to 95 p.s.i.g. This is done by adjusting the feed valve located on the locomotive, and this would be done after the train had passed off of the main line into the general dumping area, where there was no likelihood of any danger of any premature dumping. This increased pressure is then recognized on each of the cars by means of the air pressure switch 309, closing its electrical contacts 75 and 76, allowing energy to flow from the battery into the system, such that the system is now energized and ready for activation when the proper signal is received through the receivers located on the cars from the wayside transmitting station.

It is obvious that to deactivate the system as far as electrical energy is concerned, that is to cut off the supply of electrical energy into the system and place it in the safe position, the feed valve located on the locomotive would be readjusted to its normal pressure level. The train air line pressure would then be reduced to its normal level by a series of brake applications, bleeding air from the train line. This action would cause air pressure switch 309 to open its contacts 75 and 76.

In the system shown in FIG. 6, air is fed from the main reservoir on the locomotive, as previously stated, through the intermediate line 308 directly into the dumping reservoir 312. The air pressure switch 309 being connected into this system through line 405 and collar 306, as shown, the system would be activated, that is placed in the energized state, by applying main reservoir air pressure directly from the locomotive through the line 403, raised to the proper level to cause the pressure switch 309 to close its contacts 75 and 76. This system would be deactivated, that is, placed in the de-energized state, when the source of main reservoir air pressure is closed on the locomotive. The separate main reservoir air line is exhausted to the atmosphere by opening the angle cock 302 on the rear car. This action would cause air pressure switch 309 to open its contacts 75 and 76.

To describe the flow of air from the dump reservoir 312 to open the hopper car doors, we refer more particularly to FIG. 7. In this figure intermediate line 308 feeds air into the dumping reservoir 312 which is provided with a valve 313 for manually bleeding the reservoir. A tool connection 311 is provided through collar 310. In FIG. 7, air flows from the dumping reservoir 312 to the port 314 of the four-way solenoid air valve 326. The valve 326 in this illustration is shown in the energized state. The car has arrived in the general dumping area at a previous moment. Pressure on the train air line has previously been raised to the desired level to activate the pressure switch 309 closing its contacts and allowing electrical energy to flow from the battery located on the car into the electrical circuit illustrated in FIG. 4. The car has now approached the dumping point, the wayside transmitter, as illustrated in FIG. 3, is sending its audio frequency signal through antenna 503, and the car mounted antennas 504 and 505, through the circuit as illustrated in FIG. 4, are ready to receive the signal when they pass within the field of the antenna 503. As the car approaches the dumping point, and the antenna 504 or 505, as illustrated in FIG. 1, passes the end of antenna 503, the audio frequency receiver on the car picks up the audio frequency signal transmitted from the wayside car, activating the four-way solenoid valve 326 and placing it in the open position as shown in FIG. 7.

With the valve 326 in the open position as shown in FIG. 7, air flows from the dumping reservoir through port 314 through the valve out through port 321, thence through the line as shown, through the three-way manual valve 320 into port 319 of double acting cylinder 318. This shifts the piston in cylinder 318 to the opening position, causing the rod 318a, through appropriate linkage, to open the hopper car doors. It is obvious that through appropriate linkage and a reversal of the direction of the piston thrust, variations on the direction of piston movement for either opening or closing of the doors could be used. The principle, however, is the same, and the illustration in this figure is one example of a piston pushing in the direction to the right, as shown, to open the doors.

In the illustration in FIG. 7, air is exhausted through port 317 of the air cylinder 318, passes out through the three-way manual valve 316, in through port 315 of the solenoid air valve, and with the valve energized as shown, is permitted to flow out through exhaust port 322 to the atmosphere. Pipe connections 323 and 324 supply air to additional cylinders if required to open other series of hopper doors on the same car.

Figure 8:
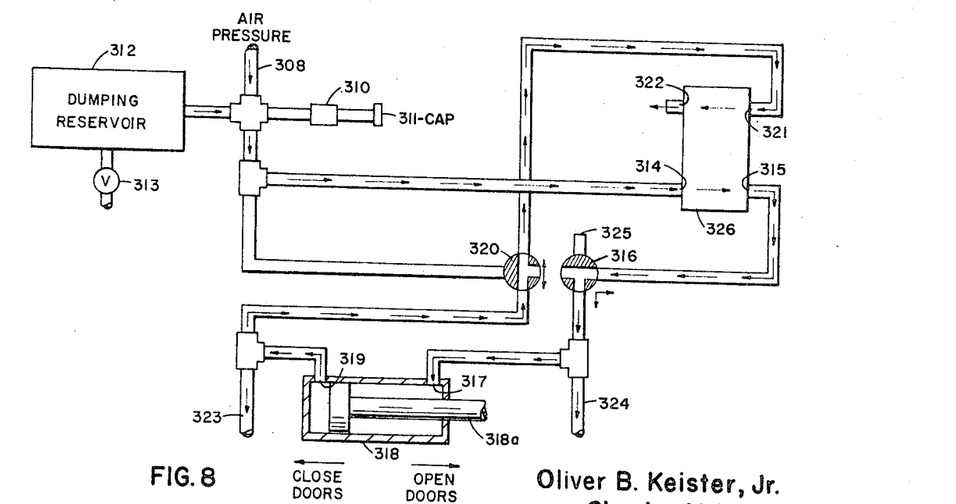
FIG. 8 is a diagrammatic view of the pneumatic system showing the flow of air and the position of the piston in closing the hopper doors.

Referring to FIG. 8, to close the hopper doors, in the illustrated embodiment, air flows from the dumping reservoir 312 to the pressure port 314 of the four-way solenoid air valve 326. At this point in the illustration, the car has been completely dumped at the dumping point, and has now passed slowly along the track such that the antennas 504 or 505 on the car have passed beyond the end of the loop on the opposite end of the transmitting antenna 503. At this point no further signal is received by the antennas 504 or 505 and, as can be seen by the circuit of FIG. 4, valve 326 is de-energized and the gates thereof are turned to allow the flow of air as shown in FIG. 8. As can be seen in FIG. 8, the air is now allowed to flow into port 314 through the valve out of port 315 into the line through three-way manual valve 316 into port 317 of double acting cylinder 318. This shifts the piston in cylinder 318 into the closing position. Air is exhausted through port 319 of cylinder 318 through three-way manual valve 320 to port 321 of valve 326. Air with the valve in this position flows through the valve and is exhausted through port 322 into the atmosphere. Pipe connections 323 and 324 run to other cylinders if needed.

If it is desired to operate the hopper doors manually, the three-way manual air valves 316 and 320 should be positioned from automatic to manual position. The manipulation permits air to flow, to open the doors, from dumping reservoir 312 to the three-way manual air valve 320 into port 319 of the double acting cylinder 318. This shifts the piston in the cylinder 318 to the opening position. Air is exhausted through port 317 through three-way manual air valve 316, and through port 325 to the atmosphere.

To close the doors manually, the three-way manual air valves 316 and 320 are returned to the automatic position. This permits air to flow from the dumping reservoir 312 to pressure port 314 of the four-way solenoid air valve 326. With this valve de-energized the air is permitted to flow from the pressure port 314 to the port 315 and thence through the line and through the three-way manual air valve 316 into port 317 of the double acting cylinder 318. This shifts the piston in cylinder 318 to the closing position. Air is exhausted through port 319 of cylinder 318 through the three-way manual valve 320 through the line to the port 321 of the solenoid air valve 326. With the valve 326 in the de-energized position air is permitted to flow from port 321 to the exhaust port 322 to the atmosphere.

While we have previously described the metered signal responsive safety switch as being an air pressure switch, responsive to a metered increase in air pressure in the system, in order to close this switch and allow electrical energy to flow from the battery to the solenoid air valve, we also use, in another embodiment of the invention, an electronic switch, responsive to a metered signal. In such an embodiment, a transistor circuit in connection with an audio frequency receiver is employed such that the transistor completed circuit allows the flow of electrical current from the battery mounted on the car to the solenoid air valve when said circuit is completed. In such case, the wayside transmitter would transmit or overlay a predetermined signal of metered selected strength to activate our metered signal responsive safety switch, and thus allow the flow of electrical energy in the circuit of the valving means when said circuit had been activated by the principal predetermined signal transmitted by the wayside transmitter to the car mounted antennas 504 or 505.

Figure 10:
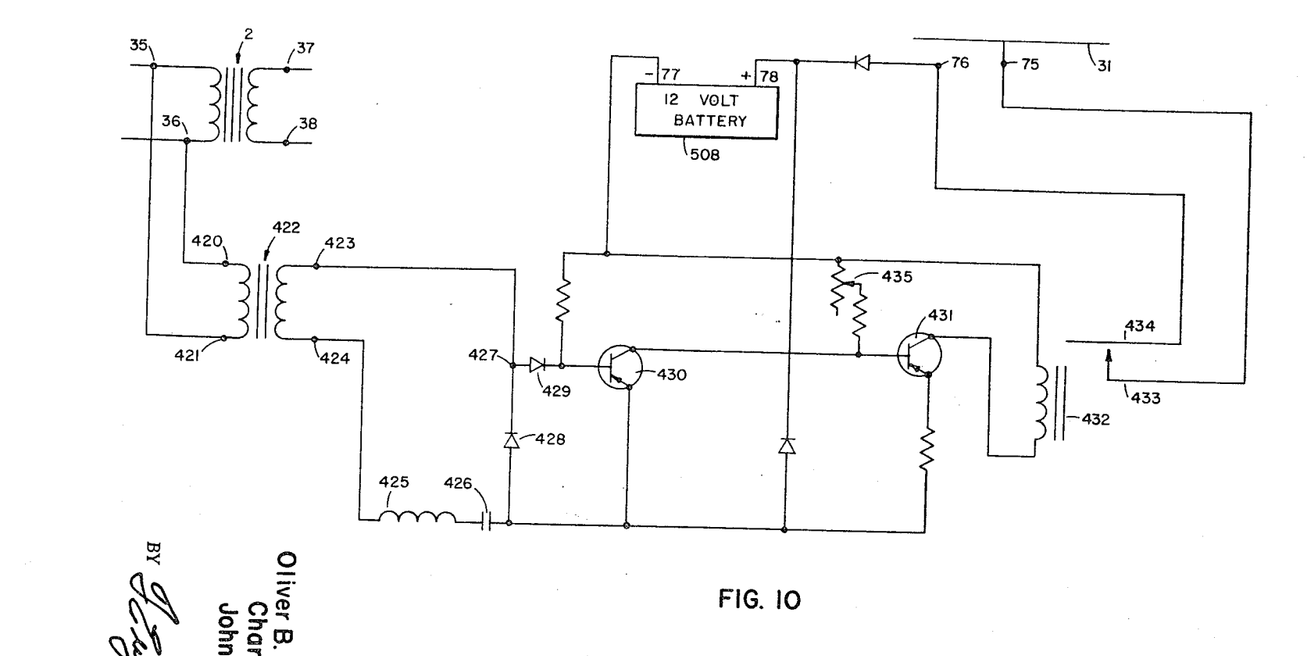
FIG. 10 is a circuit diagram of an electronic safety switch system.

This type embodiment of the invention can be illustrated in FIG. 10. Therein a metered signal of varying intensity or of different frequency from that received by the main dumping receiver of the car is simultaneously transmitted over the wayside antenna or antennas 503 and picked up by the car antennas 504 and 505 which also serve the safety switch circuit. The signal is fed from leads 35 and 36 to terminals 420 and 421 of matching transformer 422, through leads 423 and 424 to the frequency selective network toroid coil 425 and capacitor 426 to the junction 427 of diodes 428 and 429. Here the signal is rectified before reaching the input of transistor 430. Transistor 430 amplifies the signal and is direct coupled to the output transistor 431. Transistor 431 amplifies the signal to a level sufficient to energize the relay 432 closing contacts 433 and 434. The adjustable resistor 435 is adjusted to allow the electronic switch to operate at the determined distance from the wayside antenna with optimum performance.

When the electronic switch is used in place of the air pressure switch, as the metered signal responsive switch, and responsive to a different signal than that used to activate the main receiver, two different frequencies can be overlaid and transmitted by the wayside station before the dumping system will be activated.

It will also be obvious, as can be seen from the embodiment shown, that the location of the car mounted antenna, or antennas at each end of the car can be established such that a signal can be received from either side of the track, with the wayside antenna or antennas on both sides of the track located at an appropriate distance and in dependent and proportional relationship to the location of the corresponding car mounted antenna. We have shown the car mounted antenna located under the protected overhang of the bin of the hopper car and at the outer edge of the side of the car such that it may be protected from damage in the loading operation of the car. The same is true of the location of the other physical components of the system, which can be located in appropriate places on the car, depending on the size and shape of the car.

In the present invention, each hopper car comprises a compact, self-sustaining unit. The system can be operated while the train is slowly moving through the dumping area, and is a completely automatic system for dumping hopper cars, making it unnecessary to stop the train for the activation of the dumping mechanism.

The combination of the units is completely unique. A power source is employed which is inherently present on all trains, that is, train air, which must be present for the braking system. Direct current power source carried on each individual car is not dependent upon the operation of the main train electrical system.

At the same time, the combination is one involving the highest degree of safety, in that there is no way in which the cars may be prematurely dumped while the train is running between stations due to the presence in the combination of the safety switch. The air pressure switch cannot possibly be tripped from any outside source during the main running operation of the train, and since the safety switch is inherently operated as a metered signal responsive switch, the system can only be activated at the proper time in the dumping area.

It can be readily seen that the invention is one well adapted to achieve all of the objects and features hereinbefore set forth.

It is to be understood that certain modifications may be made without departing from the scope of the invention, and that sub combinations and features of utility may be employed without reference to others; therefore, the matter herein set forth in the specifications and drawings is purely illustrative and not as limiting.

Having thus described my invention we claim:

1. An automatic hopper car dumping control mechanism of the character described comprising, in combination, equipment on such car including means for supplying air on said car at a predetermined pressure, an air reservoir for storing an operating supply of air communicating therewith, an air cylinder having a reciprocating piston link connected to urge the hopper doors into the closed position in one direction and draw said doors into the open position in the opposite direction, an influent-effluent air line connected with said cylinder on the opposing sides of said piston and communicating with said air reservoir supply source through an electro-mechanical valving means, said valving means comprising a normally de-energized solenoid air valve having gate means admitting air from said reservoir supply source to the door opening side of said cylinder while exhausting from the opposite side when said valve is electrically energized and admitting air to the door closing side of said cylinder while exhausting from the opposite side when said valve is electrically de-energized, battery means for supplying electrical energy to said solenoid air valve, a metered signal responsive safety switch interposed between said battery means and solenoid valve normally maintaining the electrical circuit therebetween in the open position but responsive to a metered signal to close said circuit, an audio frequency receiver mounted on said car, said receiver being pre-tuned and having an antenna directionally mounted such as to cause the same to receive a predetermined carrier free audio frequency generated signal in the dumping area to activate the main power circuit between said battery means and solenoid, and a wayside located audio frequency transmitter in said dumping area, said transmitter having a correspondingly directionally mounted antenna such as to produce a continuous field of transmitted predetermined carrier free audio frequency generated signal to said receiver of the same pre-tuned frequency as said receiver in said dumping area in dependent and proportional relationship with the time and distance required to dump said car.

2. An automatic hopper car dumping control mechanism as described in claim 1, wherein said means for supplying air comprises the main train air line connected through the AB brake valve and an intermediate line with said reservoir and valving means.

3. An automatic hopper car dumping control mechanism as described in claim 1, wherein said means for supplying air comprises a separate train air line connected through an intermediate line with said reservoir and valving means.

4. An automatic hopper car dumping control mechanism as described in claim 1, wherein said means for supplying air comprises a combination of the main train air line connected through the AB brake valve and a separate train air line, both connected through an intermediate line with said reservoir and valving means.

5. An automatic hopper car dumping control mechanism as described in claim 1, wherein said metered signal responsive safety switch comprises a normally open air pressure electrical switch connected with said means for supplying air and responsive to a metered increase of the air pressure above normal traveling pressure such as to cause the contacts of said switch to close and allow electrical energy to be supplied to said valving means.

6. An automatic hopper car dumping control mechanism of the character described in claim 1, wherein said metered signal responsive safety switch comprises an audio frequency receiver in a transistor completed normally open circuit, said receiver responsive to an overlayed transmitted predetermined audio frequency generated signal from said wayside audio transmitter to complete said circuit closing and energizing said circuit to said valving means.

References Cited

UNITED STATES PATENTS

| | | | |
|---|---|---|---|
| 2,138,695 | 11/1938 | Duncan | 105—286 |
| 3,041,448 | 6/1962 | Pascoe et al. | 246—63 |
| 3,295,704 | 1/1967 | Gillick et al. | 105—240 X |
| 3,368,081 | 2/1968 | Giesking | 105—311 X |

FOREIGN PATENTS 171,754   11/1921   Great Britain.

ARTHUR L. LAPOINT, *Primary Examiner.*

HOWARD BELTRAN, *Assistant Examiner.*

U.S. Cl. X.R.

105—240, 311; 246—1, 63; 303—6.1